United States Patent [19]
Peddinghaus

[11] 3,820,431
[45] June 28, 1974

[54] CONVEYOR HAVING THRUST MEANS MOVABLE IN A SERIES OF DISCRETE STROKES AND PROVIDED WITH AN ABUTMENT FOR ENGAGING THE REAR END OF AN ARTICLE TO BE FED TO A PREDETERMINED POSITION ON THE CONVEYOR

[76] Inventor: Carl Ullrich Peddinghaus, Obere Lichtenplatzer Strasse 276, 5600 Wuppertal-Barmen, Germany

[22] Filed: Apr. 3, 1972

[21] Appl. No.: 240,747

[30] Foreign Application Priority Data
Apr. 17, 1971  Germany .......................2118652

[52] U.S. Cl. ....................... 83/251, 83/264, 83/278, 83/422, 214/1.5
[51] Int. Cl. ............................................. B26d 7/16
[58] Field of Search ............ 83/278, 422, 437, 251, 83/253, 263–265, 207; 214/1.5, 1.6

[56] References Cited
UNITED STATES PATENTS
1,798,038   3/1931   Scott et al. ............................ 83/437
1,969,503   8/1934   Eksergian ............................ 83/251
3,250,162   5/1966   Bunting............................ 83/278 X
3,292,799   12/1966  Eggleston et al. ................ 83/207 X Primary Examiner—J. M. Meister
Attorney, Agent, or Firm—Holman & Stern

[57]                 ABSTRACT

A conveyor for use in conveying articles provided with thrust means movable in a series of discrete strokes, with the thrust means having an abutment at one end for engaging the rear end of an article which is to be conveyed and means for applying a force to such an article whereby the rear end of said article will be brought and/or maintained in engagement with said abutment after said thrust means has completed each feeding stroke.

3 Claims, 2 Drawing Figures

CONVEYOR HAVING THRUST MEANS MOVABLE IN A SERIES OF DISCRETE STROKES AND PROVIDED WITH AN ABOUTMENT FOR ENGAGING THE REAR END OF AN ARTICLE TO BE FED TO A PREDETERMINED POSITION ON THE CONVEYOR

BACKGROUND OF THE INVENTION

The invention relates to a conveyor for use in conveying articles such as, for example, rods which are to be cut in predetermined lengths, the conveyor having thrust means which is arranged to engage the rear end of the article to be conveyed, with said thrust means being arranged to operate in a series of discrete strokes so that it remains stationary for a short time between feeding movements.

With conveyors of this kind, the articles frequently have to be conveyed to an exact, predetermined place. This applies in particular when the articles are in the form of rods which are to be cut into predetermined lengths by shears. Since such an article is often of considerable mass, it possesses a considerable kinetic energy when being conveyed by the conveyor, with said energy increasing, in a known manner, in proportion to the speed of conveyance. When the conveyor stops, the article will try to continue moving because of its momentum, so that the length of track of the conveyor may be overrun. In order to counteract this disadvantage stops can be used at the end of the conveyor track opposed to the thrust means, with said stops being adjustable to various positions. These stops are, however, subjected to considerable stress when the article hits them and must therefore be of considerable mass. Since, in addition, they frequently have to be constructed so that they can be lowered in order thay they will not prevent the article from being conveyed further, for example after shears have carried out a cut, malfunctioning often occurs as a result of these stops being damaged.

OBJECT AND SUMMARY OF THE INVENTION

The object of the invention is therefore to provide a conveyor in which the means used up until now for limiting the lengths of feed are no longer needed.

In accordance with the invention, there is provided a conveyor for use in conveying articles, said conveyor comprising thrust means movable in a series of discrete strokes and having an abutment for engaging the rear end of an article which is to be fed to a predetermined position on the conveyor, and means for applying a force to an article being fed so as to tend to urge the article in a direction opposite to the direction of feed or so as to tend to exert a retarding effect on the article as it is moved forward by said thrust whereby the rear end of said article will be brought and/or maintained in engagement with said abutment after said thrust means has completed a feeding stroke as aforesaid.

The force exerted in the direction opposite to the direction of feed can, if necessary, be initially overcome by that of the thrust member. Moreover, when said thrust means stop said force exerted in the opposite direction to the direction of feed can first of all be overcome by the kinetic energy still within the material being conveyed. Since, however, this kinetic energy will quickly decline, the article being conveyed will be finally moved back by said force by the amount which it first of all covered. The article then comes to rest again against the thrust means and is thus in its correct position. In this position, for instance, the shears where provided can carry out their cutting operation.

The aforesaid force applying means may take various forms. For example, the conveyor may include a known roller track which is inclined to the horizontal so that its lower end is adjacent to said thrust means. In this case it is, therefore, the force of gravity which forms said force applying means.

It frequently happens, however, that the roller track cannot be constructed in this form. This is particularly so if dividing shears are disposed along the course of the track. In this case at least part of the rollers can be arranged to be driven in an opposite direction to the direction of feed. Here it is particularly convenient if rollers disposed between the thrust means and the shears are driven for at least part of the time in an opposite direction to the direction of feed. This has the advantage that no further reversing force acts on the article being conveyed after it has been separated by means of the shears. The separated part can then be conveyed further in any way desired.

In an alternative arrangement of the invention, resilient means are provided and are, in use, connected between the thrust means and article being conveyed so that after the thrust means has stoped at the end of a stroke, said resilient means will be extended by onward movement of the article due to the momentum thereof, with the resilient means subsequently contracting to bring the rear end of the article back to engage the thrust means.

In this case, the kinematic conditions during conveying are met in a particularly advantageous manner by the action of the resilient means being governed by means of a hydraulic oscillation damper, the valves of which are arranged in such a way that a smaller damping force is exerted in the direction of feed than in the opposite direction. After the thrust means has stopped, the article can therefore run on relatively smoothly first of all and is then halted by the progressively increasing force developed in the resilient means and is finally moved back slowly in the opposite direction so that it comes to a relatively gentle stop on the thrust means and is prevented from rebounding on the thrust member.

The invention will now be more particularly described with reference to the accompanying drawings wherein:

DETAILED DESCRIPTION OF THE INVENTION

Figure 1:
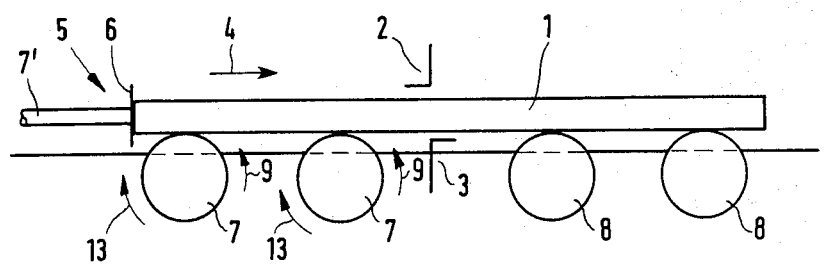
FIG. 1 shows in diagrammatic form a side view of one embodiment of a conveyor in accordance with the invention and FIG. 2 shows, also in diagrammatic form, a side view of another embodiment of a conveyor in accordance with the invention.

In FIG. 1 the material being conveyed consists of concrete reinforcing rods 1. These rods are required to be cut by means of shears which are made up of parts 2 and 3 shown in diagrammatic form. The direction of feed of the conveyor is indicated by the arrow 4. On the left hand end of the rods 1 there is thrust means 5 in the form of a ram 7' which is movable in the direction of the arrow 4 and at the end of the ram is mounted an abutment comprising a plate 6. There is also a track having rollers 7 and 8 of which the rollers 7 lie behind the shears 2,3 while the rollers 8 are disposed in front of the shears. For the sake of simplicity only four rollers of the roller track are shown.

Furthermore, the rollers 7 can be rotatably driven in the direction of the arrow 9 by any conventional means (not shown). For example, such rollers may be driven by a belt frictionally engaging their undersides or through the medium of chains or gears (themselves driven by an electric motor) which engage sprockets or gears mounted on the roller axles. The frictional force between the surfaces of the rollers 7 and the article 1 being conveyed can be overcome by such reverse drive force applied to the article by the rollers. However, it is not possible for such force (which is opposed to the direction of the arrow 4) to be greater than the force applied by the thrust member 5 when the latter is in a stationary position. The article 1 is therefore initially able to separate itself from the thrust means 5 after said ram 7' has stopped, but is then moved back again with the help of the rollers 7 until it comes to rest again on the abutment 6. The shears 2,3 can then be set into operation and the end of the rod which has been cut off can be conveyed further on the rollers 8. Following this, the thrust means 5 is again actuated until the rod is re-positioned for the next cut. Each time that a cut is made, the thrust means is of course halted for a short time.

As a variation of the above-described embodiment the roller track can be inclined to the horizontal so that its left hand end (as shown in the drawing) is lowermost. In this case the force of gravity opposes the original direction of feed and the rollers 7 need not be positively driven.

Figure 2:
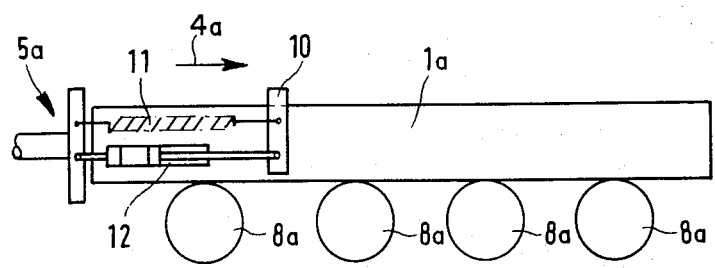

In the embodiment shown in FIG. 2 track rollers 8a are used which are not driven in a direction so that their upper surfaces travel in a direction opposite to the direction of feed 4a. In the vicinity of the thrust means 5a there is a clamping device 10 which engages the concrete reinforcing rod 1a which is to be conveyed, with said rod being again shown in diagrammatic form. Said clamping device 10 is connected to the thrust means 5a firstly through resilient means in the form of a spring 11. A further connection between the clamping device and the thrust means is formed by means of a hydraulic oscillation damper 12 which enables the article to be conveyed to run on quickly first of all in a direction opposite to the direction of the force applied by spring 11 after the thrust means 5a has stopped, and then to be pulled back slowly. In this way the rod is prevented from hitting the thrust means with a force which could cause it to rebound. In other words, the spring 11 will initially extend as the article 1a runs on and will then contract to bring said article back to the abutment at the end of the thrust means with, the movements of the spring being controlled by the damper 12 whose valves are arranged so that the spring can expand more rapidly than it can retract.

In a further embodiment of the invention, the rollers of the roller conveyor (or any other suitable conveying means) act on the article or material being conveyed so that said rollers try to transmit a speed to the material which is less than the speed transmitted by the thrust means, whereby, however, both speeds are directed in the direction of feed. Here, therefore, the only important factor is the relative speed between the thrust means and the conveyor rollers, whereby this relative speed is sufficient to bring the material safely into engagement with the thrust means. The conveyor rollers will thus tend to exert a retarding force on the article or material being fed. Compared with conveying on stationary parts there is the advantage here that the frictional forces which are to be overcome are considerably less. Furthermore, the speed of the thrust means can be slowed down during the last feed section.

Thus, as previously indicated, the track rollers (such as are shown in FIG. 1) can be conveniently used as conveyor means in this embodiment; these rollers rotate during the conveying in the direction of the arrow 13 but so that their peripheral speed is less than the maximum forward speed of the thrust means 5. In order to guarantee that the material being conveyed is brought into engagement with the thrust means 5 also at the end of feeding the rollers can be stopped completely in this same phase. Further, these rollers, as previously mentioned, can also be arranged to turn in a direction opposite to the direction of feed so that they can be used in this case at the beginning of a conveying operation in order to ensure that the material 1 to be conveyed is first of all brought into engagement with the thrust means.

I claim:

1. A conveyor for use in conveying articles, said conveyor including a track having rollers, thrust means movable in a series of discrete strokes, said thrust means having an abutment for engaging the rear end of an article which is to be fed to a predetermined position on the conveyor, and means for driving at least some of the rollers of the track in either direction of rotation at a speed relative to the speed of the thrust means thereby ensuring that the rear end of the article is maintained in engagement with the abutment of the thrust means during a stroke of the thrust means.

2. A conveyor for use in conveying articles, said conveyor including a track having rollers, thrust means movable in a series of discrete strokes, said thrust means having an abutment for engaging the rear end of an article which is to be fed to a predetermined position on the conveyor, and means for applying a force to an article being fed whereby the rear end of said article will be maintained in engagement with said abutment after said thrust means has completed a feeding stroke, said force applying means comprising means for driving at least some of the rollers in a direction of rotation such that the upper surfaces of said driven rollers will travel in a direction opposed to the direction of feed.

3. The conveyor as claimed in claim 2 wherein there is also provided a shearing device and wherein said driven rollers are disposed between said shearing device and said abutment of the thrust means.

* * * * *